UNITED STATES PATENT OFFICE.

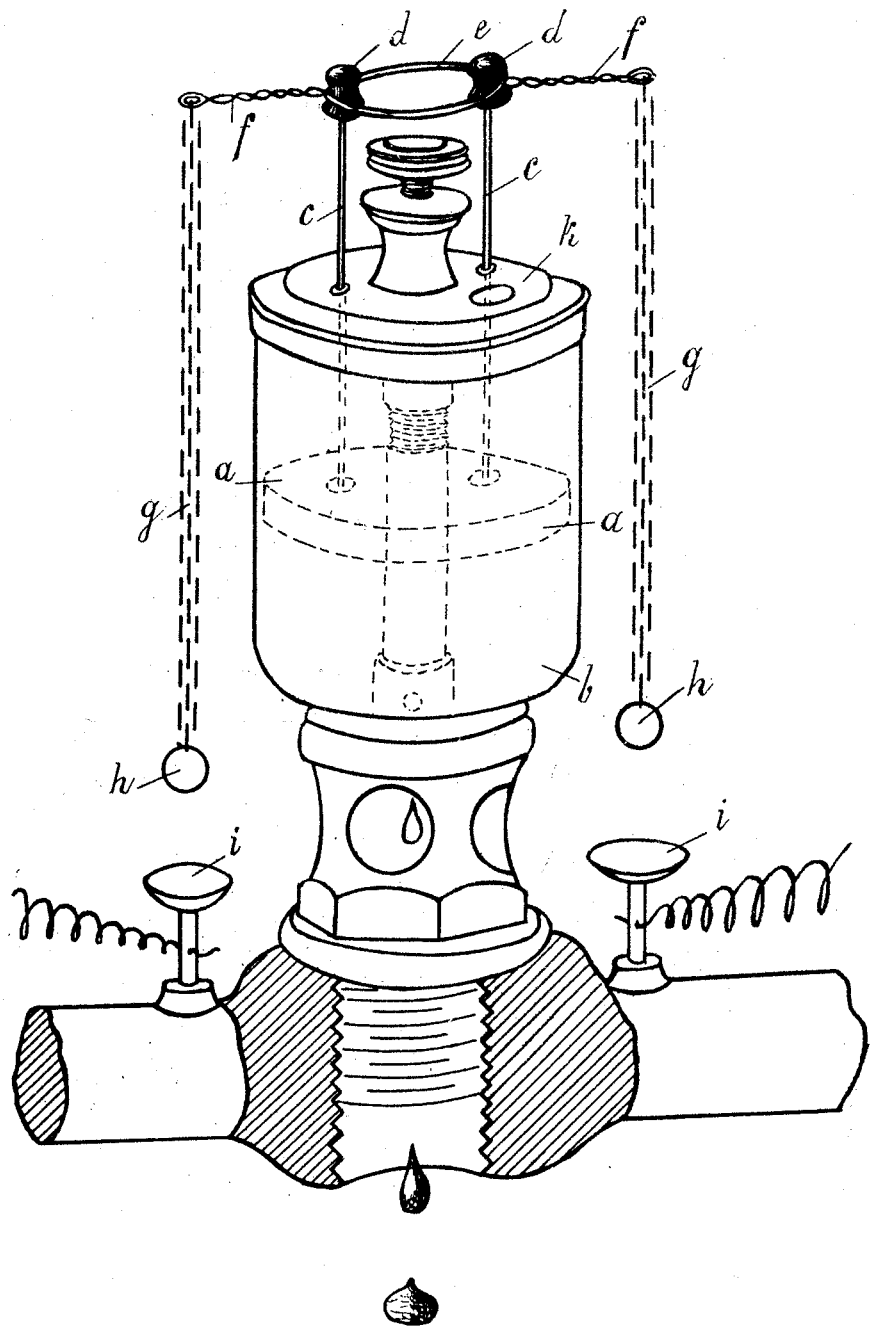

FRANZ LEMANN, OF POSEN, GERMANY.

ALARM DEVICE FOR LUBRICATORS.

1,010,058.  Specification of Letters Patent.  Patented Nov. 28, 1911.

Application filed December 29, 1910. Serial No. 599,934.

*To all whom it may concern:*

Be it known that I, FRANZ LEMANN, a subject of the German Emperor, and resident of Posen, Germany, have invented certain new and useful Improvements in Alarm Devices for Lubricators, of which the following is a specification.

This invention relates to an improved alarm device for lubricators, which is to indicate if the oil in the lubricator has been consumed.

The accompanying drawing shows the improved apparatus in a perspective view.

The apparatus comprises a float $a$ which floats on the oil in the container $b$. The float carries two metal rods $c$ which pass through the lid $k$ of the container and carry at their upper ends each a non-conducting button $d$. Around said buttons, a movable metal ring $e$ with two lateral projections $f$ is placed, from which two metal chains $g$ are suspended, which terminate in two metal balls $h$. Beneath said balls, two metal cups $i$ are located from which wires lead to an electric battery and alarm bell.

Upon the float in the container falling down to its position owing to the oil in the latter being consumed, the balls $h$ make contact with the cups $i$, whereby the electric circuit is closed and the alarm bell rings.

The movable ring $e$ allows to place the balls $h$ directly above the cups $i$ after the container has been screwed in place.

I claim:

An alarm device for lubricators, comprising in combination with the oil container, a float within the same, two rods on said float to project beyond said container, two non-conducting buttons on said rods, a movable metal ring arranged around said buttons, two lateral extensions on said ring, two depending metal chains on said extensions, two metal balls on the ends of said chains, and two metal cups beneath said balls to form the terminals of an electric alarm bell, for the purpose set forth.

In testimony whereof I have hereunto set my hand in the presence of two subscribing witnesses.

FRANZ LEMANN.

Witnesses:
RUDOLF SCHMIDT,
L. M. McKAY.